June 22, 1954
W. R. JACK ET AL
2,681,574
TORSIONAL BALANCE DEVICE
Filed April 14, 1951
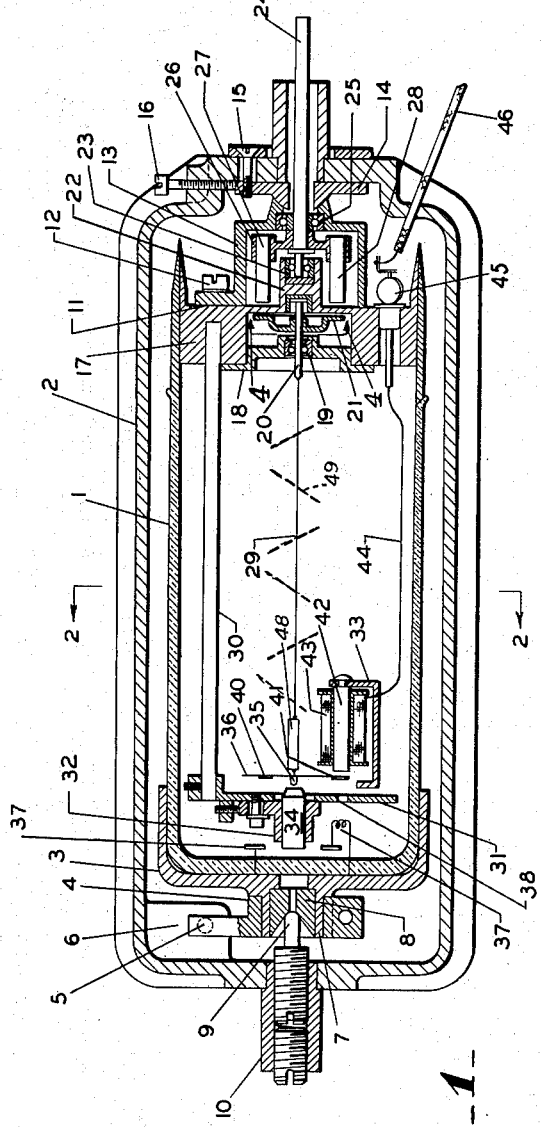
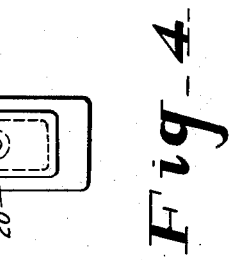
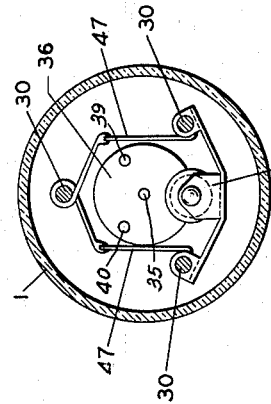
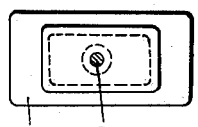
INVENTORS
WILLIAM R. JACK
BY EMIL M. BRINKER
ATTORNEY

Patented June 22, 1954

2,681,574

UNITED STATES PATENT OFFICE 2,681,574

TORSIONAL BALANCE DEVICE

William Russell Jack, Chagrin Falls, and Emil M. Brinker, Lakewood, Ohio; said Brinker assignor to said Jack Application April 14, 1951, Serial No. 221,039

5 Claims. (Cl. 73—382)

This invention relates in general to improvements in measuring and indicating devices and more particularly to apparatus adapted for measuring and indicating forces, by introducing counterbalancing forces, by the longitudinal twisting of an elongated elastic suspension medium and measuring the degree of controlled applied twisting force necessary to establish a predetermined initial equilibrium of the suspension medium.

More specifically, this is a continuation in part of our invention disclosed in our joint application for United States Letters Patent, Serial Number 150,382, filed March 18, 1950, for Torsional Balance Device, now U. S. Patent No. 2,574,395, November 6, 1951, in which we disclosed generally our underlying fundamental new and novel improvements in torsional balance devices. The present invention is directed to practical applications of the fundamental principles disclosed in the aforementioned co-pending application.

One of the primary objects of the present invention is to provide means for incorporating the novel weight suspension means in an evacuated casing.

Another object is to provide an improved means of applying a predetermined weight to the cross arm by electrically depositing, by evaporation, the mass on a cross member in the casing while the latter is evacuated, by external means.

Another object is to provide in the evacuated casing a magnetic damping means for the cross member which damping means is controllable by means external of the casing.

A further object is to provide a magnetic clutch means whereby the torsional twisting of the elastic suspension medium may be controlled by means external of the casing.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in longitudinal section taken through the torsional balance device in its evacuated transparent casing supported by its stationary support;

Figure 2 is a view in section taken along line 2—2 of Figure 1;

Figure 3 is a view in elevation of the electroplated cross arm disc; and

Figure 4 is a view in section taken along line 4—4 of Figure 1, showing, in front elevation, the rectangular magnetically attracted member carried by the rotatable shaft, to one end of which the quartz fibre is secured.

Referring more particularly to the drawings, the basic idea of the present invention involves the measurement of forces by having an elastic medium subjected to such forces and by introducing a measured opposing force sufficient to counterbalance the force whose magnitude it is desired to determine. The present invention is capable of many applications for determining the magnitude of many types of forces, as will be dealt with further hereinafter.

Accordingly, the instrument may comprise a generally cylindrical transparent casing 1 that is evacuated by any suitable conventional means. The casing is adjustably secured to a supporting frame 2. At the one end the casing is secured to a cup 3 supported by a sleeve 4 secured at 5 to a bracket 6 integral with frame 2. The reduced portion 7 of cup 3 carries a plug 8 having a conical end seat to receive a stud 9 carried in a sleeve 10 secured to support 2. At the other end, the end wall 11 of the casing 1 has secured thereto by bolts 12 a sleeve 13 centered on a flanged plate 14 secured to support 2 by bolts 15 and 16.

Inside the evacuated casing 1 is a cylindrical block 17 to which is secured a centrally apertured flange 18 carrying a ball bearing 19 for rotatably supporting a small shaft 20. Rigidly secured to shaft 20 is a member 21 of magnetically attracted metal. Rigid with end wall 11 is a sleeve 22 that carries a bearing 23 to support the forward reduced end of a rotatable shaft 24 which shaft 24 is also supported by a bearing 25 carried by sleeve 13. Rigid with shaft 24 is a sleeved flange 26 for carrying oppositely disposed longitudinally extending circumferentially spaced magnets 27 and 28 which are external of casing 1 but closely adjacent the internal magnetically attracted metallic member 21.

To the forward end of shaft 20 is secured the suspension arm having torsional elastic properties and which may take the form of a quartz fibre of minute diameter, such as shown at 29. Also secured to block 17, which is inside the casing 1, are three longitudinally extending rods 30 which support a masking disc 31, a sleeve 32 and a supporting bracket 33. Sleeve 32 supports a magnet 34.

Supported by the suspension arm is secured a ball 35 adjacent magnet 34 to be magnetically attracted by the magnet to maintain the suspension arm 29 longitudinally under tension to be taut and horizontally disposed, although this left end of the suspension arm 29 is free and physically unattached to the frame. The importance of this feature will be dealt with in greater particularity hereinafter.

Instead of employing a cross arm to be supported by the suspension arm, as disclosed in the above mentioned copending patent application, the present invention contemplates the use of a circular disc 36 secured to the suspension arm 29 immediately adjacent to and behind the ball 35. The disc 36 may be made of such material as mica.

As mentioned before, the casing is completely evacuated. In the interests of obtaining complete accuracy, the present invention contemplates the depositing of a weight on the mica disc 36 after installation and in complete vacuum. As illustrated, this may be accomplished by employing three tungsten filaments 37 inside the casing 1 with leads extending through the left end wall of the casing. These tungsten filaments 37 are charged with precious metal, such as gold. They are so placed that the masking disc 31 is between them and the mica disc 36. The masking disc 31 is provided with three circumferentially spaced holes, the largest one of which is shown vertically below the forward end of magnet 34 at 28. Suitable electrical metal evaporating process and equipment under external control is employed to make controlled and calibrated gold mass deposits 39, 40 and 41 on the mica disc 36, the heaviest mass deposit being 41, as indicated in Figure 3. This swings the mica disc 36 so that mass deposit 41 is lowermost by reason of the force of gravity. This mica disc 36 in this invention respaces the cross arm member of the above Patent No. 2,574,395.

The bracket 33 supports a damping device including a permanent magnet 42 with winding 43 having a lead 44 to an airtight binding post 45 in block 17 with an external cable 46. The purpose of the damping device is to damp the rotative, or oscillatory, movements of the electroplated mica disc through magnetic field created by the damping device.

With the magnet 34 properly adjusted to provide the proper magnetic pull on ball 35 to maintain the fibre suspension arm 29 taut under longitudinal tension, with the imposed weight of the mica disc and its mass deposit 41, the effect of gravity pull on mass 41 is to cause the mica disc 36, which is initially statically balanced in vacuum when unweighted, to pivot about its point of connection to the fibre suspension arm and to torsionally twist the latter longitudinally as the mass 41 swings toward the bottom of the casing. By means of manual or servo means, shaft 24 is then rotated in a direction opposite to the gravity induced rotation of the mica disc 36. Any suitable optical system including mirrors 47, carried by a framework supported by rods 30 within the evacuated housing, may be employed for obtaining a nulling signal without mechanical connections to the housing.

Such an optical system may also include a mirror 48 carried by the arm 29, near the ball 35, and so positioned with respect to the mirrors 47 as to produce a light beam pattern, schematically shown at 49 in Figure 1.

Due to the novel supporting system of the suspension arm, whether it be of fibre or other selected material, the mica disc, or other suitable cross member, and its mass is supported virtually at the free end of the suspension arm in order to utilize virtually the full length of the suspension arm. This increases the sensitivity of measurement forces over conventional systems by the factor of four, not counting the fact that the present invention places virtually no limit as to the fineness of diameter of the suspension arm. The present invention involves a null system of measuring which eliminates any possible systematic error. While a permanent magnet 34 and metal ball 35 have been specifically disclosed it is to be understood that the underlying principle of support of the suspension arm 29 is to have one end physically free of attachment and supported by any other means, short of physical attachment, such as by magnetic, electromagnetic, electrostatic means, and the like.

The mere presence of the permanent magnet provides a damping means which is effective as a safety device whether the unit is in actual operation or not. The damping means for damping the rotative, or oscillatory movements of the cross member mica disc with its metal mass 41, may have its damping effect controlled by suitable means external of the evacuated casing 1. One method is to control current supply to coil 43 to either counteract or enforce the magnetic field of permanent magnet 42 in order to obtain a damping factor suitable to the desired application.

In addition to the magnetic suspension of the torsional suspension arm the unit is a self-contained, completely sealed and evacuated. The torsional deformation of the suspension arm is free of external friction. The mass is electrically deposited on the mica cross member by evaporation in vacuum and not susceptible to error or variation due to atmospheric conditions. Moreover, the magnetic coupling between the input shaft 24 and the suspension arm is free of friction for rotating the suspension arm to null position in the completely sealed evacuated unit. Moreover, through any suitable optical system, in connection with the mirrors disclosed, a nulling signal may be obtained without any mechanical connections to the casing. The unit has many applications, such as an altimeter, accelerometer, pendulum, scale, mineralogical prospecting instrument, and the like. The unit is responsive, in addition to gravity forces, to forces caused by acceleration.

We claim:

1. In a measuring device, a sealed unit including an elongated evacuated casing and a mounting frame secured therein, a rotatable shaft carried by said frame in one end of said casing for rotation in a horizontal plane coincidental with the longitudinal axis of said casing, a flexible torsional suspension arm secured at its one end to said shaft, the other end of said arm extending longitudinally of said casing and being physically free and unattached to said frame and magnetic means for magnetically attracting and maintaining said suspension arm taut and disposed horizontally longitudinally in said casing, a member carrying a metallic mass disposed to be radially displaced from the longitudinal axis of said torsional suspension arm and rigidly secured to said suspension arm to be disposed in a plane at right angles to the longitudinal axis of said suspension arm, a supporting frame for said casing, a rotatable input shaft carried by said supporting frame, a magnetic coupling between said input shaft and said suspension arm carrying shaft, for torsionally deforming said torsional suspension arm in a direction to counterbalance the torque caused by the metallic mass on said member, means carried by said mounting frame inside said casing for damping the rotary and oscillatory movements of said member comprising means for providing a magnetic field to induce eddy currents in the metallic mass on said member when it is in movement and to exert a damping effect that is proportional to the magnetic field and the angular velocity of movement of said member.

2. In a measuring device, a sealed unit including an elongated evacuated casing and a mounting frame secured therein, a rotatable shaft carried by said frame in one end of said casing for rotation in a horizontal plane coincidental with the longitudinal axis of said casing, a flexible torsional suspension arm secured at its one end to said shaft, the other end of said arm extending longitudinally of said casing and being physically free and unattached to said frame and magnetic means for magnetically attracting and maintaining said suspension arm taut and disposed horizontally longitudinally in said casing, a member carrying a metallic mass disposed to be radially displaced from the longitudinal axis of said torsional suspension arm and rigidly secured to said suspension arm to be disposed in a plane at right angles to the longitudinal axis of said suspension arm, a supporting frame for said casing, a rotatable input shaft carried by said supporting frame, a magnetic coupling between said input shaft and said suspension arm carrying shaft, for torsionally deforming said torsional suspension arm in a direction to counterbalance the torque caused by the metallic mass on said member, means carried by said mounting frame inside said casing for damping the rotary and oscillatory movements of said member comprising means for providing a magnetic field to induce eddy currents in the metallic mass on said member when it is in movement and to exert a damping effect that is proportional to the magnetic field and the angular velocity of movement of said member, and electrical windings leading to the exterior of said casing for external control of the damping effect of said damping means, mirrors carried by said mounting frame inside said casing adapted to constitute a part of an optical indicating system.

3. In a measuring device, a sealed unit including an elongated evacuated casing and a mounting frame secured therein, a rotatable shaft carried by said frame in one end of said casing for rotation in a horizontal plane coincidental with the longitudinal axis of said casing, a flexible torsional suspension arm secured at its one end to said shaft, the other end of said arm extending longitudinally of said casing and being physically free and unattached to said frame and magnetic means for magnetically attracting and maintaining said suspension arm taut and disposed horizontally longitudinally in said casing, a disc rigidly secured to said suspension arm to be disposed in a plane at right angles to the longitudinal axis of said suspension arm, a metallic mass deposited near a part of the periphery of said disc and radially displaced from the longitudinal axis of said suspension arm so as to be gravity actuated to exert a torque on said suspension arm, a supporting frame for said casing, a rotatable input shaft carried by said supporting frame, a magnetic coupling between said input shaft and said suspension arm carrying shaft, including means for providing a magnetic field, for torsionally deforming said torsional suspension arm in a direction to counterbalance the torque caused by the mass on said disc.

4. In a measuring device, a sealed unit including an elongated evacuated casing and a mounting frame secured therein, a rotatable shaft carried by said frame in one end of said casing for rotation in a horizontal plane coincidental with the longitudinal axis of said casing, a flexible torsional suspension arm secured at its one end to said shaft, the other end of said arm extending longitudinally of said casing and being physically free and unattached to said frame and magnetic means for magnetically attracting and maintaining said suspension arm taut and disposed horizontally longitudinally in said casing, a disc rigidly secured to said suspension arm to be disposed in a plane at right angles to the longitudinal axis of said suspension arm, a metallic mass deposited near a part of the periphery of said disc and radially displaced from the longitudinal axis of said suspension arm so as to be gravity actuated to exert a torque on said suspension arm, a supporting frame for said casing, a rotatable input shaft carried by said supporting frame, a magnetic coupling between said input shaft and said suspension arm carrying shaft, including means for providing a magnetic field, for torsionally deforming said torsional suspension arm in a direction to counterbalance the torque caused by the mass on said disc, and damping means carried by said mounting frame inside said casing for damping the rotary and oscillatory movements of said disc.

5. In a measuring device, a sealed unit including an elongated evacuated casing and a mounting frame secured therein, a rotatable shaft carried by said frame in one end of said casing for rotation in a horizontal plane coincidental with the longitudinal axis of said casing, a flexible torsional suspension arm secured at its one end to said shaft, the other end of said arm extending longitudinally of said casing and being physically free and unattached to said frame and magnetic means for magnetically attracting and maintaining said suspension arm taut and disposed horizontally longitudinally in said casing, a disc rigidly secured to said suspension arm, to be disposed in a plane at right angles to the longitudinal axis of said suspension arm, a metallic mass deposited near a part of the periphery of said disc and radially displaced from the longitudinal axis of said suspension arm so as to be gravity actuated to exert a torque on said suspension arm, a supporting frame for said casing, a rotatable input shaft carried by said supporting frame, a magnetic coupling between said input shaft and said suspension arm carrying shaft, including means for providing a magnetic field, for torsionally deforming said torsional suspension arm in a direction to counterbalance the torque caused by the mass on said disc and damping means carried by said mounting frame inside said casing for damping the rotary and oscillatory movements of said disc, said damping means comprising means for providing a magnetic field for inducing eddy currents in said metallic mass on said disc when it is in movement and to exert a damping effect that is proportional to the magnetic field and the angular velocity of movement of said disc.

References Cited in the file of this patent

UNITED STATES PATENTS

| Number | Name | Date |
|---|---|---|
| 1,950,142 | Hastings | Mar. 6, 1934 |
| 1,995,305 | Hayes | Mar. 26, 1935 |
| 2,032,381 | Stoutenburgh | Mar. 3, 1936 |
| 2,218,140 | Wright et al. | Oct. 15, 1940 |
| 2,291,628 | Ising | Aug. 4, 1942 |
| 2,574,395 | Jack et al. | Nov. 6, 1951 |

FOREIGN PATENTS

| Number | Country | Date |
|---|---|---|
| 478,359 | Germany | June 24, 1929 |
| 557,732 | Germany | Aug. 27, 1932 |